United States Patent [19]

Trecker et al.

[11] Patent Number: 4,960,605

[45] Date of Patent: Oct. 2, 1990

[54] GRATED HARD PARMESAN CHEESE AND METHOD FOR MAKING SAME

[75] Inventors: Gary W. Trecker, Wheeling; Susan P. Monckton, Glen Ellyn, both of Ill.

[73] Assignee: Kraft, Inc., Glenview, Ill.

[21] Appl. No.: 389,292

[22] Filed: Aug. 3, 1989

[51] Int. Cl.$^5$ .................. A23C 19/086; A23C 19/097
[52] U.S. Cl. .................................. 426/582; 426/273; 426/289; 426/322
[58] Field of Search ............... 426/582, 322, 291, 273, 426/292, 289, 473

[56] References Cited

U.S. PATENT DOCUMENTS

| 3,840,672 | 10/1974 | Kasik et al. | 426/582 |
| 4,032,669 | 6/1977 | Peters et al. | 426/582 |
| 4,251,551 | 2/1981 | Van Hulle et al. | 426/582 |

OTHER PUBLICATIONS

1980 Food and Drug Administration, pp. 188-198.

21 CFR Ch. 1 (4-1-89 Ed.) Section 133.161, 214-227.

Primary Examiner—Donald E. Czaja
Assistant Examiner—Helen Pratt
Attorney, Agent, or Firm—Fitch, Even, Tabin & Flannery

[57] ABSTRACT

In accordance with the present invention, Parmesan cheese is grated to provide a particulate Parmesan cheese. The grated Parmesan cheese is dried to a moisture level of from about 19% to about 24% by weight. Either before or after the drying step, disodium phosphate is blended with the grated Parmesan cheese. After a period of time, the disodium phosphate is dissolved into the grated Parmesan cheese. After dissolution of the disodium phosphate, the Parmesan cheese particles remain discrete and the Parmesan cheese particles resist agglomeration and oil-off even at moisture levels of from about 19% to about 24% and at temperatures higher than ambient.

16 Claims, 1 Drawing Sheet

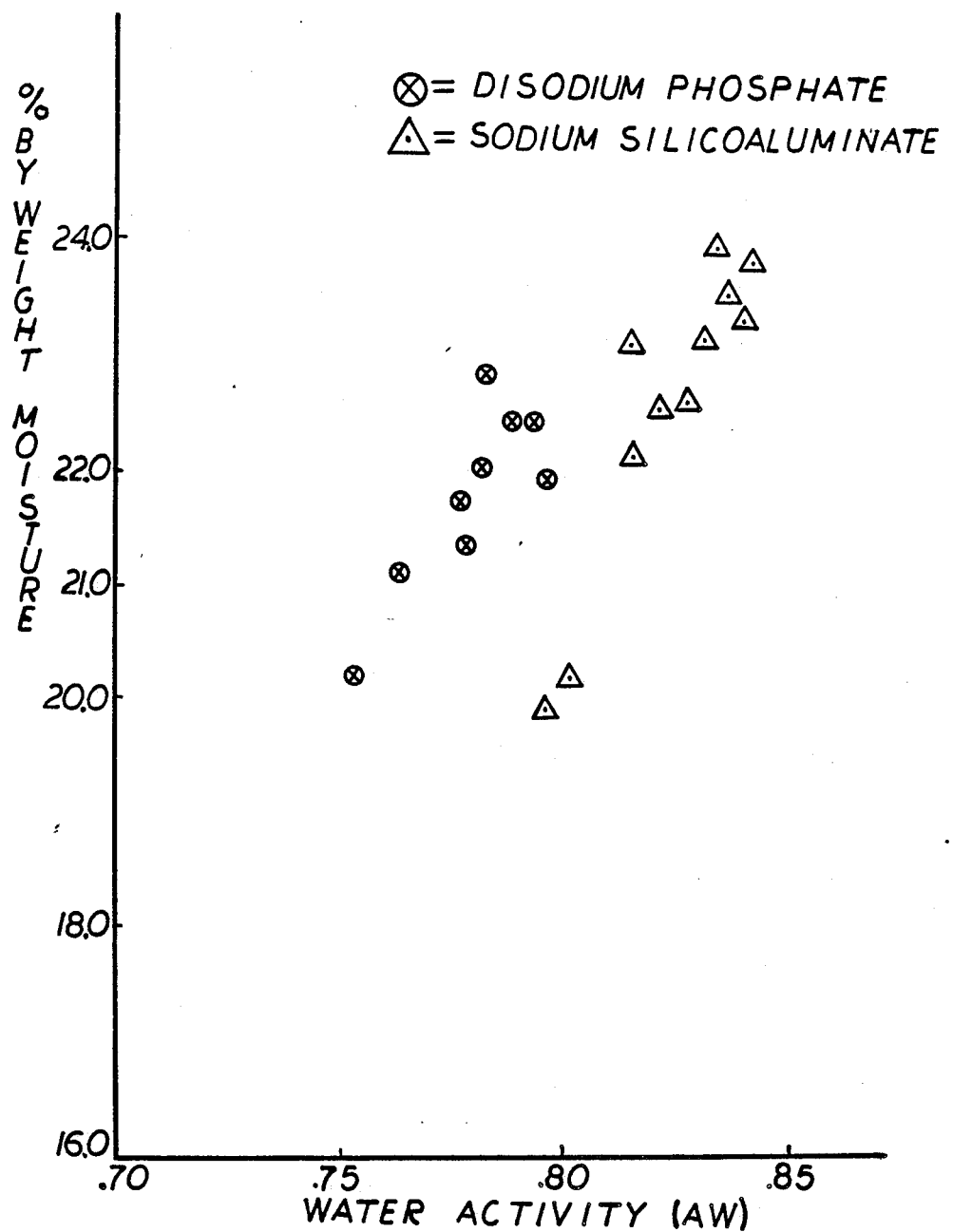

GRATED HARD PARMESAN CHEESE AND METHOD FOR MAKING SAME

The present invention is directed to a method for the manufacture of grated hard cheese. More particularly, the method of the present invention provides grated hard cheese at a relatively high moisture which is nonagglomerating.

FIELD OF THE INVENTION

Parmesan cheese is the name in common use for a group of very hard cheeses which are customarily used in a grated form. Included in the group are Parmigiano, Reggiano, Lodigiano, Lombardi, Emiliano, Veneto, and Baggozo. They differ in size and shape and in fat content. Also, there are some differences in methods of manufacture. Fully cured Parmesan cheese is very hard but keeps almost indefinitely. It can be grated easily and is commonly used as grated cheese on salads and soups, and with pasta. In the United States, Parmesan cheese is cured for ten months. The moisture level of the cured cheese is between 30% and 32% and the fat level is between 22% and 32%.

It is known to produce a grated Parmesan cheese which is sold in containers for direct use on salads and in soups. The grated Parmesan cheese usually available in the marketplace is dried to a moisture level of from between about 12% and 18%. At this moisture level there is little problem of clumping or agglomeration of the grated cheese product. In accordance with the present invention, a grated Parmesan cheese is provided which has a higher moisture in the range of from about 19% to about 24%. At such high moisture levels, the grated Parmesan cheese undergoes substantial fat exudation at temperatures which are modestly higher than ambient temperatures. Upon subsequent cooling to ambient or refrigeration temperatures, the grated Parmesan cheese tends to clump together. The present invention provides a higher moisture grated Parmesan cheese which does not agglomerate during storage and which can be easily removed from a package.

DESCRIPTION OF THE DRAWINGS

FIG. 1 is a plot of moisture versus water activity for various samples of Parmesan cheese particles containing either disodium phosphate or sodium silico aluminate as an additive.

SUMMARY OF THE INVENTION

In accordance with the present invention Parmesan cheese is grated to provide a particulate Parmesan cheese. The grated Parmesan cheese is dried to a moisture level of from about 19% to about 24% by weight. Either before or after the drying step, disodium phosphate is blended with the grated Parmesan cheese. After a period of time, the disodium phosphate is dissolved into the grated Parmesan cheese. After dissolution of the disodium phosphate, the Parmesan cheese particles remain discrete and the Parmesan cheese particles resist agglomeration and oil-off even at moisture levels of from about 19% to about 24% and at temperatures higher than ambient.

DETAILED DESCRIPTION OF THE INVENTION

Generally, in accordance with the invention cured Parmesan cheese having a moisture level from about 30% to about 32% and a fat level of from about 28% to about 32% is comminuted to provide Parmesan cheese particles having a nominal diameter in the range of from about 0.5 mm to about 1.7 mm. The Parmesan cheese particles are subjected to drying conditions to reduce the moisture level of the particles to a level of from about 19% to about 24%. All percentages herein are by weight unless otherwise indicated.

In accordance with the invention, disodium phosphate is added to the Parmesan cheese particles, either before or after drying, to prevent agglomeration of the relatively high moisture Parmesan cheese particles and to reduce the water activity to below about 0.8. The disodium phosphate can be either in anhydrous form or can be disodium dihydrate. The disodium phosphate, on an anhydrous basis, is added at a level sufficient to provide agglomeration and oil-off resistant properties. Preferably the disodium phosphate is added at a level of from about 1.0% to about 3.0% based on the weight of the Parmesan cheese particles.

In an important embodiment of the present invention, the Parmesan cheese is first shredded to provide Parmesan cheese shreds which are subsequently comminuted with suitable apparatus, such as a hammermill, to provide Parmesan cheese particles. In this embodiment, the disodium phosphate is preferably blended with the Parmesan cheese shreds prior to comminution. The disodium phosphate can, however, be blended with the Parmesan cheese particles after comminution and before drying or can be blended with the Parmesan cheese particles after drying. Drying is effected in any suitable apparatus, such as a fluid bed dryer.

The Food and Drug Administration has provided standards of identity for grated cheeses, such as Parmesan cheeses. In accordance with the standards of identity, various optional ingredients can be added to the grated cheese. The standards of identity previously provided for the addition of an anti-caking agent selected from silicon dioxide, calcium silicate, sodium silico aluminate, microcrystalline cellulose or any combination of two or more of these anti-caking agents. The standards of identity now provide that any safe and suitable anti-caking agent may be used. In accordance with the present invention, it has been determined that none of the previously approved anti-caking agents under the standards of identity prevent Parmesan cheese particles having a moisture level of 19% to 24% from agglomerating and clumping, and they do not provide the desired low water activity.

While not wishing to be bound by any theory, it is believed that the disodium phosphate particles dissolve in the moisture phase of the cheese and subsequently precipitate calcium phosphate. This removes calcium from the casein and it is believed that such decalcified casein protein is in a form that blocks fat exudation and prevents sticking of the particles to one another and prevents agglomeration and clumping of the particles during subsequent storage.

Transmission electron micrographs of grated Parmesan cheese particles treated with disodium phosphate reveal a layer and in some cases multiple layers enclosing the protein matrix. The electron density of the layer nearest the particle surface suggests lipid interspersed with a network of proteins. These proteins tend to aggregate in a dense sublayer at the surface of the particle becoming less dense away from the particle surface. This protein network may serve to stabilize the lipid and water surrounding each particle preventing agglomeration and clumping.

Disodium phosphate is highly soluble and as it dissolves in the available moisture of the grated Parmesan cheese, it increases the amount of solutes in the moisture phase. This, in turn, reduces the water activity of the system, as compared to product at comparable moisture levels (19–24%) containing traditional anticaking agents. Water activity is an indicator of the available moisture in a food system. As available moisture decreases, the potential for microbial spoilage or other chemical or enzymatic degradation reactions which might influence product quality also decreases. Water activity is measured in terms of relative humidity proximate to the food system. A water activity of 1.0 is equivalent to 100% relative humidity.

In general, water activity less than 0.80 is desirable to maintain product stability. Most spoilage organisms are inactive at water activities of less than about 0.8. Disodium phosphate at the levels of use of the invention in grated Parmesan having a moisture content of 19–24% produces a water activity of from 0.75–0.795. Grated Parmesan cheese having a moisture level of from about 19–24% and containing traditional anticaking agents produces a water activity from 0.795 to 0.83 at the same level of use. Some spoilage organisms (molds) are capable of growing at water activities less than 0.80. Sorbic acid may be used as an effective mold inhibitor in grated Parmesan cheese.

In another embodiment of the invention, monosodium phosphate is provided as part of the total phosphate. In general, from about 0% to about 50% of monosodium phosphate is used based on the total weight (anhydrous basis) of phosphate. It is particularly preferred to use monosodium phosphate at a level such that a mixture of disodium phosphate and monosodium phosphate provides a pH in aqueous solution which is the same as the pH of the cheese, i.e., a pH of from about 5.4 to about 5.6.

It is known to use insoluble phosphates, such as tricalcium phosphate, as an anti-caking agent. Insoluble phosphates, such as tricalcium phosphate, have been found to be inactive in the prevention of agglomeration of relatively high moisture Parmesan cheese particles. While such use of insoluble phosphates is known, it is believed to be novel to use a soluble phosphate to prevent agglomeration and clumping of high moisture Parmesan cheese particles. The use of insoluble phosphates for the prevention of caking is described in "Phosphates as Food Ingredients", R. H. Ellinger, CRC Press, Cleveland, Ohio (1972) pp 32–33.

The following example further illustrates various features of the present invention but it is not intended to limit the scope of the invention which is defined in the appended claims.

EXAMPLE 1

Full moisture Parmesan cheese, ranging between about 30% and 32% moisture is continuously delivered by a moving ram into a 15-knife cheese shredder (Murray Machinery) which comminutes the cheese into fragmented shreds ranging up to one inch in length. The Parmesan shreds are transported with the aid of a pneumatic conveyor into a self-emptying cheese holding surge bin provided with agitation means. The shredded cheese (pH of about 5.20 to 5.30) accumulates within the bin to a point where a minimum level can be maintained during processing. The shredded Parmesan is discharged from the surge bin through an auger conveyer which transports the cheese to a hammer-mill disintegrator (Rietz Co.)

At the same time that the shredded cheese is being conveyed to the hammer-mill, an additive preblend consisting of 84.9% anhydrous disodium phosphate (DSP) and 15.1% powdered potassium sorbate is added through a volumetric filler into the shredded cheese just ahead of the hammer mill disintegrator. The volumetric ratio of additives is designed to yield a 1.8% level of DSP and a 0.32% level of potassium sorbate by weight in the dried grated Parmesan at 22% moisture.

The hammer-mill disintegrator comminutes the Parmesan cheese shreds in conjunction with the additive preblend into a grated form, providing a homogeneous blend of the additive preblend and the cheese particles. The resulting cheese has a particle size ranging from about 0.50 mm to about 1.7 mm in diameter. At this point of the process, the moisture is between about 27% and 29%. The cheese pH is about 5.45.

The grated Parmesan cheese is fed directly from the hammer-mill disintegrator to a fluid bed dryer (Carrier Inc.), comprised of both heating and cooling sections. Mass flow through the dryer is about 8500 lbs/hr. with a total residence time of approximately 13 minutes. At the heating section of the dryer, inlet air is 109° F., outlet air is 70° F. while product temperature is 73° F. At the cooling section, inlet air is 50° F. and outlet air is at 64° F. The finished grated Parmesan is discharged from the dryer at 22% moisture at about 60°–62° F.

Conventional grated Parmesan cheese, at an 18% maximum moisture level without additives, is produced using the same comminuting and drying equipment. The grated Parmesan cheese (18% moisture) has a pH of about 5.35 and an equivalent particle size to that of the 22% moisture cheese with additives. The 18% moisture cheese is used as a control for comparative testing against the 22% moisture grated Parmesan containing DSP and potassium sorbate. Samples of the 22% moisture grated Parmesan with additives (1.8% DSP, 0.32% potassium sorbate) and 18% moisture control product without additives are packaged into 8 oz. composite cans (canister) comprised of 3 ply spiral-wound paper with an inner wax coating. The grated Parmesan cheese samples are placed at storage temperatures ranging between 45° F. and 113° F.

After two months storage under refrigerated conditions (45° F.), the samples are evaluated for degree of caking within the canister and flowability out of the canister. The 22% moisture grated Parmesan with DSP exhibits performance equal to that of the 18% moisture grated Parmesan containing no additives. Very minimal caking is observed in either canister, while the flowability of each grated Parmesan out of the canister is very good.

Higher moisture grated Parmesan (>19% moisture), without the presence of DSP, typically experiences caking under refrigerated conditions and is lumpy when dispensed from the canister. Caking generally intensifies with increasing moisture levels beyond 19%. The presence of DSP alleviates the caking which occurs under refrigerated conditions for higher moisture grated Parmesan (19–24% moisture).

EXAMPLE 2

Grated Parmesan samples at 22% moisture with 1.8% disodium phosphate and 18% moisture grated Parmesan without additives are subjected to elevated storage temperature conditions; temperatures that would reflect actual distribution and storage of the grated product. Product stability is monitored by evaluating the degree of free butterfat which soaks into the paper component of the canister and also by observing the amount of product caking within the canister and flowability out of the canister. There is a direct correlation between fat separation and degree of caking in the samples subjected to elevated temperature storage.

At 113° F. for one day and 98° F. for one month, 22% moisture grated Parmesan with DSP exhibits a comparable amount of exuded butterfat and caking (minimal) to that of the conventional 18% moisture grated Parmesan without additives. Under extended storage conditions at 83° F. for 5 months, the 22% moisture grated Parmesan samples are improved over the 18% moisture grated Parmesan; exhibiting oil-off/caking to a lesser degree and slightly lighter in color. The 22% moisture grated Parmesan with DSP is microbiologically stable at the conclusion of its 9 month shelf life. The product exhibits flowability, performance and appearance comparable to that of the 18% moisture Parmesan without additives.

Higher moisture grated Parmesan (19-24%) without DSP added exudes a great amount of free fat under elevated temperature storage and subsequently cakes to a point where it cannot be dispensed from the canister. Additionally, the higher moisture product without DSP, at elevated temperatures, eventually becomes discolored; becoming darker yellow with increasing fat separation.

EXAMPLE 3

In accordance with the procedure outlined in Example 1, grated Parmesan cheese particles are produced. Additives are subsequently blended into the dried cheese after the fluid bed drying step. DSP at 1.9% and potassium sorbate at 0.32% (levels based on weight of dried cheese) are added to the grated Parmesan (pH of 5.27) and mixed batchwise for 5 minutes in a rotary drum mixer (Munson Machinery Co.).

Packaging and storage conditions of Example 1 are repeated for the 22% moisture grated Parmesan with additives. For comparative purposes, samples of both 18% and 22% moisture grated Parmesan, without additives are packaged and subjected to the same storage conditions.

After 4 weeks of storage at 98° F., the 22% moisture grated Parmesan with additives (pH=5.62) displays comparable stability/performance to that of the 18% moisture Parmesan without additives (pH=5.35). The 22% moisture grated Parmesan without additives (pH=5.40) exhibits unacceptable oil-off and caking after 3 days storage at 98° F.

Under cold storage conditions (45° F), the 22% moisture product with additives exhibits good flowability from the canister, comparable to that of the 18% moisture product. The 22% moisture Parmesan without additives displays moderate caking and is very lumpy when dispensed from the canister.

EXAMPLE 4

The procedure of Example 3 is repeated with the exception that varying levels of monosodium phosphate are used in combination with disodium phosphate, maintaining a total sodium phosphate level of 1.9% by weight. Three ratios of monosodium phosphate:disodium phosphate are used; 25% MSP:75% DSP, 50:50 and 75:25 in 22% moisture Parmesan. A 50:50 ratio of monosodium/disodium phosphate results in cheese with good flavor and pH of 5.35; a pH comparable to that of 18% moisture grated Parmesan without additives. The 75:25 monosodium/disodium phosphate combination results in a product pH of 5.20 and imparts a sour flavor to the cheese.

All Parmesan samples with varying levels of monosodium/disodium phosphate exhibit acceptable stability during storage; comparable to that of the 22% moisture grated Parmesan (containing 1.9% disodium phosphate) described in Example 3.

EXAMPLE 5

Samples of Parmesan cheese particles were produced with various levels of moisture between 19% and 24% using the method of Example 3. Either disodium phosphate or sodium silicoaluminate were added to each of the samples at a level of 1.5%. The water activity of each of the samples was determined and the results are set forth in FIG. 1. It can be seen that the water activity of the samples containing disodium phosphate ranged between 0.75 and 0.79, whereas the water activity of the samples containing sodium silicoaluminate was substantially higher, ranging between 0.795 and 0.83.

The oil-off and caking properties of the samples containing disodium phosphate were similar to those reported in Examples 1, 2 and 3, whereas the samples containing sodium silicoaluminate were unacceptable exhibiting substantial oil-off and caking under both ambient and elevated (98°) storage conditions.

What is claimed is:

1. Parmesan cheese particles which are shelf stable and which resist agglomeration and oil-off, said particles having a moisture content when packaged of from about 19% to about 24% and said particles consisting of disodium phosphate at a level sufficient to provide agglomeration and oil-off resistant properties.

2. Parmesan cheese particles of claim 1 having a water activity of less than 0.8.

3. Parmesan cheese particles of claim 1 wherein said disodium phosphate is present at a level of from about 1% to about 3% by weight of said particles.

4. Parmesan cheese particles in accordance with claim 1 having a nominal diameter of from about 0.5 mm to about 1.7 mm.

5. Parmesan cheese particles in accordance with claim 1 wherein monosodium phosphate is used to replace up to about 50% of said disodium phosphate.

6. A method for manufacture of Parmesan cheese particles with higher moisture which are resistant to agglomeration and oil-off consisting of
   (a) comminuting Parmesan cheese to provide Parmesan cheese particles,
   (b) drying said particles to a moisture content of from about 19% to about 24%, and
   (c) blending disodium phosphate with said Parmesan cheese particles at a level sufficient to substantially prevent agglomeration of said Parmesan cheese particles.

7. A method in accordance with claim 6 wherein said disodium phosphate is blended with said Parmesan cheese particles prior to drying.

8. A method in accordance with claim 6 wherein said disodium phosphate is blended with said Parmesan cheese particles after drying.

9. A method in accordance with claim 6 wherein said disodium phosphate is added at a level of from about 1% to about 3% by weight of said dried Parmesan cheese particles.

10. A method in accordance with claim 6 wherein said Parmesan cheese particles have a nominal diameter of from about 0.5 to about 1.7 mm.

11. A method in accordance with claim 6 wherein said Parmesan cheese is shredded prior to said comminution and said disodium phosphate is blended with said Parmesan cheese shreds prior to said comminution.

12. A particulate Parmesan cheese product consisting of particulate Parmesan cheese having a moisture content of from about 19 to about 24% by weight of the particulate Parmesan cheese, and an amount of disodium phosphate effective for reducing oil-off and agglomeration of the particulate Parmesan cheese, the Parmesan cheese product being resistant to agglomeration and oil-off.

13. A method of reducing the agglomeration and oil-off of Parmesan cheese particles consisting of:
blending Parmesan cheese particles having a moisture content of from about 19% to about 24% by weight of the Parmesan cheese particles with from about 1% to 3 weight % based upon the weight of the Parmesan cheese particles of disodium phosphate.

14. A particulate Parmesan cheese product which is shelf stable and which resist agglomeration and oil-off, the product consisting of:
Parmesan cheese particles having a moisture content of from about 19 to about 24%; and
from about 1 to about 3 weight % based upon the weight of the cheese of disodium phosphate blended with the particulate cheese to provide a Parmesan cheese product which is resistant to agglomeration and oil-off.

15. A method as recited in claim 13 wherein the cheese particles have a nominal diameter of from about 0.5 mm to about 1.7 mm.

16. A particulate Parmesan cheese product as recited in claim 14 wherein the cheese particles have a nominal diameter of from about 0.5 mm to about 1.7 mm.

* * * * *

UNITED STATES PATENT AND TRADEMARK OFFICE
CERTIFICATE OF CORRECTION

PATENT NO. : 4,960,605

DATED : October 2, 1990

INVENTOR(S) : Gary W. Trecker; Susan P. Monckton

It is certified that error appears in the above-identified patent and that said Letters Patent is hereby corrected as shown below:

Column 8 Claim 13, line 6, after "to", insert --about--.

Signed and Sealed this

Twenty-fifth Day of February, 1992

Attest:

HARRY F. MANBECK, JR.

*Attesting Officer*       *Commissioner of Patents and Trademarks*